(12) United States Patent
Kwak et al.

(10) Patent No.: US 11,706,395 B2
(45) Date of Patent: Jul. 18, 2023

(54) APPARATUS AND METHOD FOR SELECTING CAMERA PROVIDING INPUT IMAGES TO SYNTHESIZE VIRTUAL VIEW IMAGES

(71) Applicant: Electronics and Telecommunications Research Institute, Daejeon (KR)

(72) Inventors: Sang Woon Kwak, Daejeon (KR); Joung Il Yun, Daejeon (KR); Young Ju Jeong, Yongin-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 17/199,177

(22) Filed: Mar. 11, 2021

(65) Prior Publication Data
US 2021/0289187 A1 Sep. 16, 2021

(30) Foreign Application Priority Data
Mar. 12, 2020 (KR) .......................... 10-2020-0030816

(51) Int. Cl.
*H04N 13/111* (2018.01)

(52) U.S. Cl.
CPC .................. *H04N 13/111* (2018.05)

(58) Field of Classification Search
CPC ............ H04N 13/111; H04N 5/23238; H04N 13/282; H04N 13/156; H04N 13/243
USPC .......................................................... 348/36
See application file for complete search history.

(56) References Cited

U.S. PATENT DOCUMENTS

| | | | |
|---|---|---|---|
| 8,687,000 B2* | 4/2014 | Panahpour Tehrani | ..................... G06T 15/405 345/422 |
| 8,731,279 B2 | 5/2014 | Shin et al. | |
| 10,650,590 B1* | 5/2020 | Topiwala | ................ H04L 67/61 |
| 10,939,068 B2* | 3/2021 | Katoh | .................. G06T 3/0025 |

(Continued)

FOREIGN PATENT DOCUMENTS

| | | |
|---|---|---|
| KR | 101698847 B1 | 1/2017 |
| KR | 1020170017700 A | 2/2017 |

(Continued)

OTHER PUBLICATIONS

Ryan S. Overbeck et al., A System for Acquiring, Processing, and Rendering Panoramic Light Field Stills for Virtual Reality, ACM Trans. Graph., vol. 37, No. 6, Article 197., Nov. 2018, pp. 197:1-197:15.

*Primary Examiner* — Thai Q Tran
*Assistant Examiner* — Stephen R Smith
(74) *Attorney, Agent, or Firm* — William Park & Associates Ltd.

(57) ABSTRACT

The present disclosure provides an apparatus and a method for selecting camera providing input images to synthesize virtual view images. According to the present disclosure, A method of selecting a camera providing as input image to synthesize a virtual view image, the method may comprise, for a camera providing an input image, determining whether or not the camera is comprised in a field of view (FoV) at a virtual view position and in response to the camera determined to be comprised in the field of view, selecting the camera to synthesize the virtual image, wherein the determining determines, by way of comparison, whether or not a direction from the virtual view position to a position of the camera is in the FoV at the virtual view position.

16 Claims, 13 Drawing Sheets

(56) References Cited

U.S. PATENT DOCUMENTS

| | | | |
|---|---|---|---|
| 10,949,986 B1* | 3/2021 | Colmenares | A61B 34/20 |
| 2007/0296721 A1 | 12/2007 | Chang et al. | |
| 2020/0120370 A1* | 4/2020 | Breitenfeld | H04N 5/9201 |
| 2021/0029294 A1* | 1/2021 | Deshpande | H04N 5/23238 |
| 2021/0112228 A1* | 4/2021 | Yamamoto | H04N 13/111 |
| 2021/0142442 A1* | 5/2021 | Musiienko | G02B 27/0172 |
| 2021/0152848 A1* | 5/2021 | Mizuno | H04N 13/282 |
| 2021/0185299 A1* | 6/2021 | Burian | H04N 5/247 |
| 2022/0252848 A1* | 8/2022 | Kurtz | H04N 5/2258 |

FOREIGN PATENT DOCUMENTS

| | | |
|---|---|---|
| KR | 1020180019695 A | 2/2018 |
| KR | 101915729 B1 | 11/2018 |
| KR | 1020190011224 A | 2/2019 |
| WO | 2014062663 A1 | 4/2014 |
| WO | 2017106659 A1 | 6/2017 |

* cited by examiner

APPARATUS AND METHOD FOR SELECTING CAMERA PROVIDING INPUT IMAGES TO SYNTHESIZE VIRTUAL VIEW IMAGES

CROSS REFERENCE TO RELATED APPLICATION

The present application claims priority to Korean Patent Application No. 10-2020-0030816, filed Mar. 12, 2020, the entire contents of which are incorporated herein for all purposes by this reference.

BACKGROUND OF THE INVENTION

Field of the Invention

The present disclosure relates to a method and apparatus for selecting a camera providing an input image to synthesize a virtual view image. More particularly, the present disclosure relates to a method and apparatus for selecting a camera providing an optimal input image to efficiently synthesize and reproduce a virtual view image from the input image.

Description of the Related Art

As various techniques of image processing and broadcasting communication are developed, a technology of recreating and experiencing a real world by using actual image-based multiview images or computer graphic images has been developed. One of the representative technologies is the virtual reality (VR) technology that constructs three-dimensional images or stereoscopic images providing shape information with respect to both depth and space simultaneously by using images with various views and provides the images to users.

In immersive media like virtual reality, providing image contents supporting 6 degrees of freedom (DoF) is important to provide a high sense of immersion to a user. Providing an image supporting 6 DoF means that motion parallax is for users according to 3 DoF of rotations in the directions of roll (left-right tilting), yaw (left-right rotation) and pitch (front-back tipping) and 3 DoF of front-back, up-down and left-right translations. When an appropriate virtual view image with 6 DoF supporting motion parallax according to a user's movement, the user may have a high sense of immersion and reality.

However, when the synthesis of a virtual view image is intended based on not CG images but actual image-based images, it is very difficult to obtain and provide every image supporting 6 DoF in every possible view. Accordingly, virtual view image synthesis, that is, virtual view synthesis using a limited number of input images is essential to make a virtual view image for a user in a virtual position.

The depth image based rendering (DIBR) using 3D warping and the light field rendering (LFR) are representative technologies for virtual view image synthesis. The light field (LF) of the LFR technology refers to a field for representing every light in a space. Unlike DIBR, which synthesizes a virtual view image by expressing lights in a space by pixels, that is, points on a 2D plane, LFR expresses such lights in a space by directional rays, thereby providing a photorealistic virtual view image.

Especially, "A Systems for Acquiring, Processing, and Rendering Panoramic Light Field Stills for Virtual Reality" by R. Overbeck, et al. (ACM Trans. Graph, Nov. 2018) introduced a method of obtaining and rendering an omnidirectional light field image. It discloses a method of constructing a virtual view image by efficiently sampling and mixing rays in an image corresponding to a user's virtual view region from a light field image that is densely obtained for all directions.

It discloses a method of calculating and selecting, for objects within an FoV (field of view) of a virtual view image, corresponding input rays and necessary input view images, when an omnidirectional light field image is selected, the virtual view image is synthesized but there is no geometry information on the omnidirectional light field image.

However, this method is inefficient since computational complexity for finding out necessary input rays is very high. In addition, the usage of memory may significantly increase already in a process of recalling geometry information for a whole omnidirectional light field input image.

SUMMARY

The present disclosure provides an apparatus and a method for selecting camera providing input images to synthesize virtual view images.

According to the present disclosure, a method of selecting a camera providing an input image to synthesize a virtual view image, the method may comprise, for a camera providing an input image, determining whether or not the camera is comprised in a field of view (FoV) at a virtual view position and in response to the camera determined to be comprised in the field of view, selecting the camera to synthesize the virtual image, wherein the determining determines, by way of comparison, whether or not a direction from the virtual view position to a position of the camera is in the FoV at the virtual view position.

According to the present disclosure, an apparatus for selecting a camera providing an input image to synthesize a virtual view image, the apparatus may comprise a receiver for receiving information on a camera providing an input image and a processor for using the information on the camera providing the input image, determining, for the camera, whether or not the camera is comprised in an FoV at a virtual view position, and in response to the camera determined to be comprised, selecting the camera to synthesize the virtual image, wherein the processor determines by comparing a direction from the virtual view position to a position of the camera and the FoV at the virtual view position.

According to the present disclosure, a computer program, by being stored in a medium, for selecting a camera providing an input image to synthesize a virtual view image, the computer program may comprise, for a camera providing an input image, determining Whether or not the camera is comprised in a field of view (FoV) at a virtual view position and in response to the camera determined to be comprised, selecting the camera to synthesize the virtual view image, wherein whether or not the camera is comprised is determined by comparing a direction from the virtual view position to a position of the camera and the FoV at the virtual view position.

According to the present disclosure, it is possible to select a camera suitable for synthesizing a realistic virtual viewpoint. image provided to a user.

According to the present disclosure, it is possible to reduce computational complexity, rendering complexity and memory usage for providing a virtual viewpoint image to a user.

According to the present disclosure, it is possible to synthesize a virtual viewpoint image based on a selected camera without using geometric information of a camera image.

The effects obtainable in the embodiments of the present disclosure are not limited to the above-mentioned effects, and other effects not mentioned may be clearly derived and understood by those ordinary skilled in the art to which the technical configuration of the present disclosure is applied from the following description of the embodiments of the present disclosure.

DETAILED DESCRIPTION OF THE INVENTION

Figure 1:
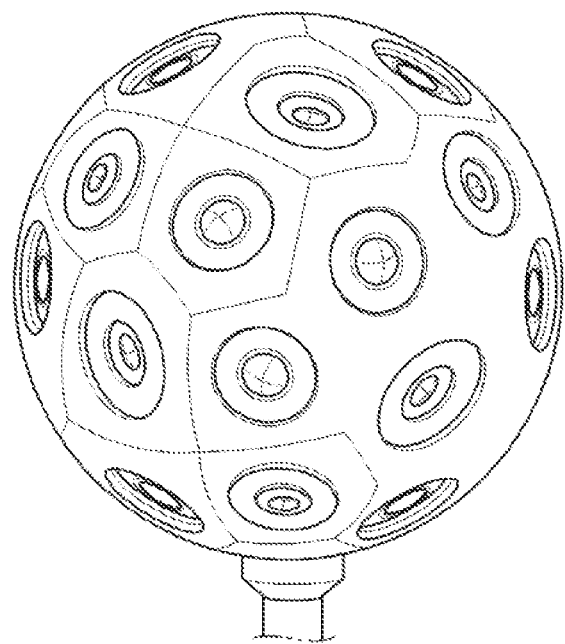
FIG. 1 shows one shape of camera rig for obtaining an input image for synthesizing a virtual view image applicable to the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein. In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Hereinafter, embodiments of the present disclosure will be described with reference to the accompanying drawings.

In the present disclosure, a view may have a meaning including a virtual view and a free view.

Also, in the present disclosure, a camera and an input camera may be used in a same meaning.

Also, in the present disclosure, an input image may be used in a meaning including an omnidirectional light field input image and be an image collected from a camera.

Also, in the present disclosure, a position of a virtual view and a project center of the virtual view may be used in a same meaning.

Also, in the present disclosure, a FoV of virtual view, a FoV of virtual view position, and a FoV of virtual view image may all be used in a same meaning.

Hereinafter, embodiments of the present disclosure will be described with reference to the accompanying drawings.

In the present disclosure, several embodiments will be disclosed including a method and apparatus for selecting a camera providing an input image for virtual view synthesis by using not geometry information but only a camera parameter. As described above, in the present disclosure, when selecting a camera obtaining an omnidirectional light field image, a significant effect may be expected. However, it does not mean that the present disclosure may be used only to select an omnidirectional light field image. Whenever it is necessary to select a camera providing an input image for virtual view image synthesis, the present disclosure may be applicable.

FIG. 1 shows one shape of camera rig for obtaining an input image for synthesizing a virtual view image applicable to the present disclosure. More particularly, FIG. 1 shows a camera rig with a sphere-like shape for collecting an actual image-based image to synthesize a virtual view image supporting 6 degrees of freedom according to an embodiment of the present disclosure.

However, the structure of a camera rip obtaining an omnidirectional light field input image according to an embodiment of the present disclosure is not limited to the sphere-like camera rig of FIG. 1. For example, it is possible to use a polygonal shape like rectangle and pentagon or a layered camera rig structure obtained by vertically expanding polygonal cameras. Moreover, it is also possible to use a structure obtained by connecting and fixing many cameras through a camera rig. The present disclosure is not limited to the above-mentioned structures. The number, positions and directions of cameras included in a camera rig may be various depending on purposes, and there is no limit on them.

Although it is obvious that various structures of camera rigs as described above are available, when describing many embodiments of the present disclosure below, unless otherwise specified, it is assumed that the camera rig with the shape of FIG. 1 is used. It is assumed that a camera rig obtaining an input image is centered at the origin in a three-dimensional space and a radius is R. It is assumed that the centers of cameras are located on the surface of a sphere and a camera rig includes one or more of the cameras.

A camera selection apparatus providing an input image for virtual view image synthesis may be configured in various structures. The apparatus maybe designed to include a processor for selecting an input image and a camera rig. In this case, the locations of one or more cameras included in the camera rig, the radius of the camera rig, and a viewing direction of each camera may be identified from the camera rig by the processor, for example. However, the apparatus described in FIG. 2 is assumed to receive information on an external camera rig by being connected to the camera rig but is not limited thereto.

Figure 2:
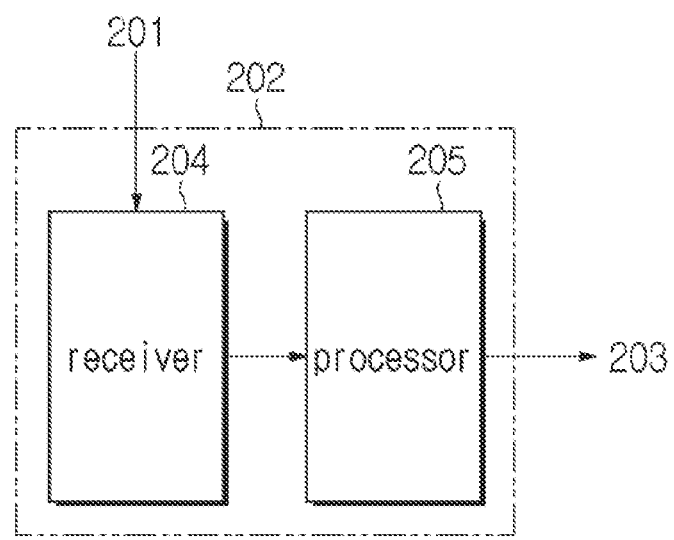
FIG. 2 illustrates an apparatus for selecting a camera providing an input image for synthesizing a virtual view image according to an embodiment of the present disclosure.

FIG. 2 illustrates an apparatus for selecting a camera providing an input image for synthesizing a virtual view image according to an embodiment of the present disclosure.

More particularly, as an example, an apparatus 202 for selecting a camera providing the input image includes a receiver 204 for receiving information on the camera and a processor 205 for determining whether or not the camera is included in a field of view (FoV) at a virtual view position by using information 201 on the camera providing the input image and, when it is determined that the camera is included, selecting the camera. Herein, the processor determines whether or not the camera is included by comparing a direction from the virtual view position to the position of the camera with the field of view at the virtual view position.

For example, the information 201 on the camera providing the input image may become an input value of the apparatus 202 for selecting a camera providing the input image and be a value received by the receiver 204 of the apparatus 202. Information on a camera providing an input image may include the positions of each of one or more cameras included in a camera rig, information on each camera, and information on a shape or a structure of a camera rig. Herein, the shape of a camera rig may be estimated through the processor 205 by using a position of a camera included in the camera rig. However, as it is information on shape itself, it may be received through the receiver 204 but is not limited thereto. In addition, the information may include every viewing direction of the one or more cameras included in the camera rig. However, when the camera rig has an equally radial shape, the direction may be the same as the camera center and thus the information may be omitted.

As an example, the positions of each of the one or more cameras may be represented by a position vector, and each direction that the camera is looking at may be given as a rotation matrix or a direction vector but is not limited thereto.

When receiving the information on the camera rig from the receiver 204, the processor 205, as an example, may determine a virtual view position for synthesizing a virtual view image or identify a field of view at the virtual view position according to a preset virtual view position and then determine whether or not the camera is included in the field of view. Herein, for example, the processor may define a virtual sphere with a significantly extended radius and then determine the positions of each camera included in the camera rig on the extended sphere. For each camera, it is determined whether or not a vector connecting the position of the camera thus determined and a virtual view position is included in the field of view. When it is determined that the vector is included in the field of view, the camera may be selected, and an image collected from the camera, that is, an input image may be used to synthesize a virtual view image. This will be described in further detail in FIG. 4 and FIG. 5. When a camera rig is equally radial in all directions, simpler selection may be possible. In this regard, an embodiment maybe described in further detail in FIG. 8, FIG. 9, FIG. 10A, FIG. 10B and FIG. 10C.

In addition, even when it is determined that the camera is not included in the field of view, it should be further determined whether an image collected from the camera, that is, a camera image may be actually used to synthesize a virtual view image. This will be described in further detail in FIG. 6.

Figure 3:
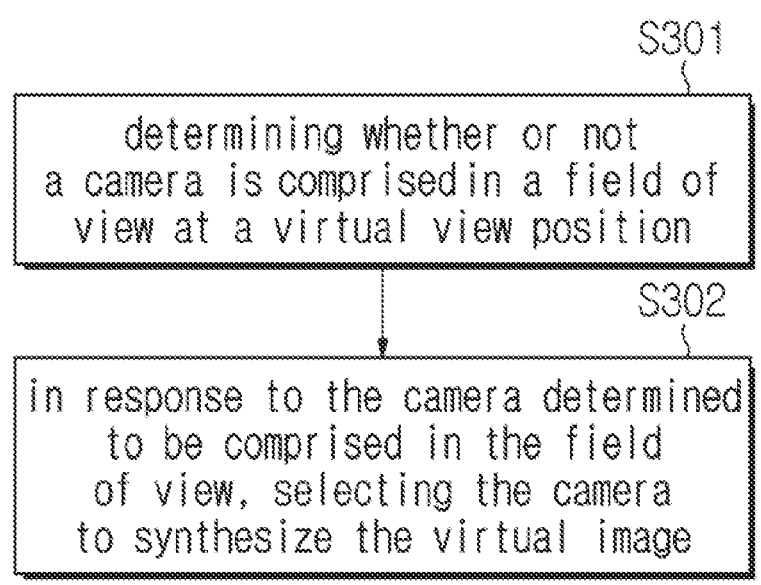
FIG. 3 illustrates a method for selecting a camera providing an input image for synthesizing a virtual view image according to an embodiment of the present disclosure.

FIG. 3 illustrates a method for selecting a camera providing an input image for synthesizing a virtual view image according to an embodiment of the present disclosure.

As one embodiment, the selection method includes determining whether or not a camera is included in a field of view at a virtual view position (S301) and selecting the camera when it is determined that the camera is included (S302). Herein, the selecting may include determining by comparing a direction from the virtual view position to the position of the camera to the field of view at the virtual view position.

For example, the determining whether or not a camera is included in a field of view at a virtual view position (S301) maybe, more specifically, determining, for every camera included in a camera rig, whether or not the camera is included in a field of view at a virtual view position. In addition, this step may be performed after defining a virtual sphere with a significantly extended radius and determining each camera position on the sphere thus extended. The step S301 may include determining, for each camera, whether or not the camera position determined on the virtual sphere is included in the field of view.

As an example, the positions of each of the one or more cameras may be represented by a position vector, and each direction that the camera is looking at may be given as a rotation matrix or a direction vector. In addition, the determining of whether or not a camera is included in a field of view may be indicating by a vector oriented to the position of each of the one or more cameras at a virtual view position and determining whether or not the vector is included in a field of view at the virtual view position but is not limited thereto. This will be described in further detail in FIGS. 4 to 6.

Herein, when a camera rig is equally radial in all directions, simpler selection maybe possible. In this regard, an embodiment may be described in further detail in FIG. 8, FIG. 9, FIG. 10A, FIG. 10B and FIG. 10C.

When it is determined that the camera is included, an image of the camera selected by the selecting (S302) of the camera, that is, an input image may be used to synthesize a virtual view image.

Figure 4:
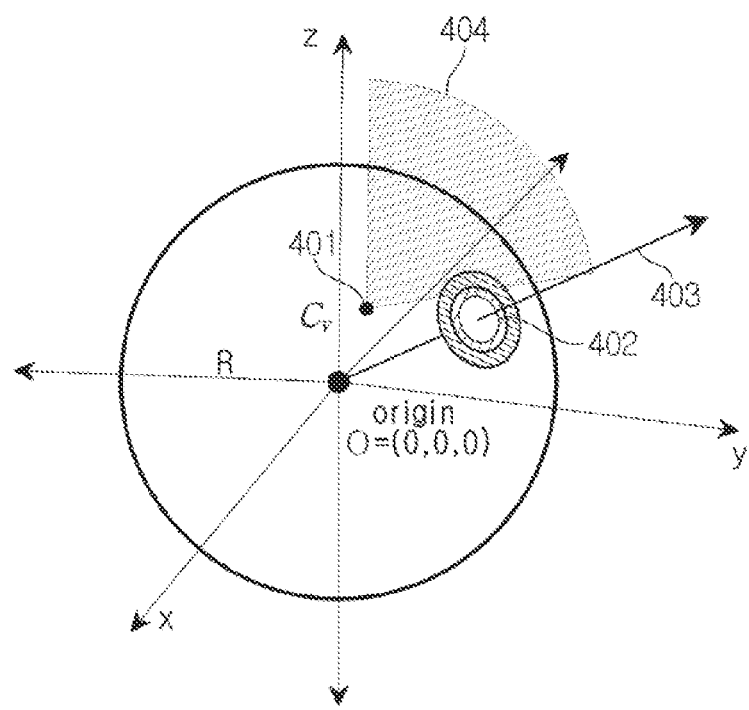
FIG. 4 illustrates a camera for obtaining an image for synthesizing a virtual view image according to an embodiment of the present disclosure.

FIG. 4 illustrates a camera rig for obtaining an input image for synthesizing a virtual view image according to an embodiment of the present disclosure. As one embodiment, as described above, it is assumed that a camera rig may have a radius R and its center exists at an origin (0, 0, 0) of x, y and z axes. It is also assumed that a position 401 of the virtual view for synthesizing a virtual view image may be represented by $C_v$ and a field of view 404 is given from the position 401 of the virtual view. As one embodiment, the camera rig is illustrated to have only one camera for convenience sake but two or more cameras may be included. As described above, the number, positions and directions of cameras included in a camera rig may be various depending on purposes. The position 402 of i-th camera (n>=i), which is one of n cameras (n is a natural number, n>=i) included in the camera rig, may be represented by $C_i$, and a viewing direction 403 of the i-th camera may be represented by $R_i$.

For example, as described above, a position of a camera included in the camera rig and a viewing direction may be given as a position vector $C_i$ and a rotation matrix $R_i$ or a direction vector respectively but are not limited thereto. A polar coordinate is worthy of consideration. A virtual view position may exist either inside or outside a camera.

Figure 5:
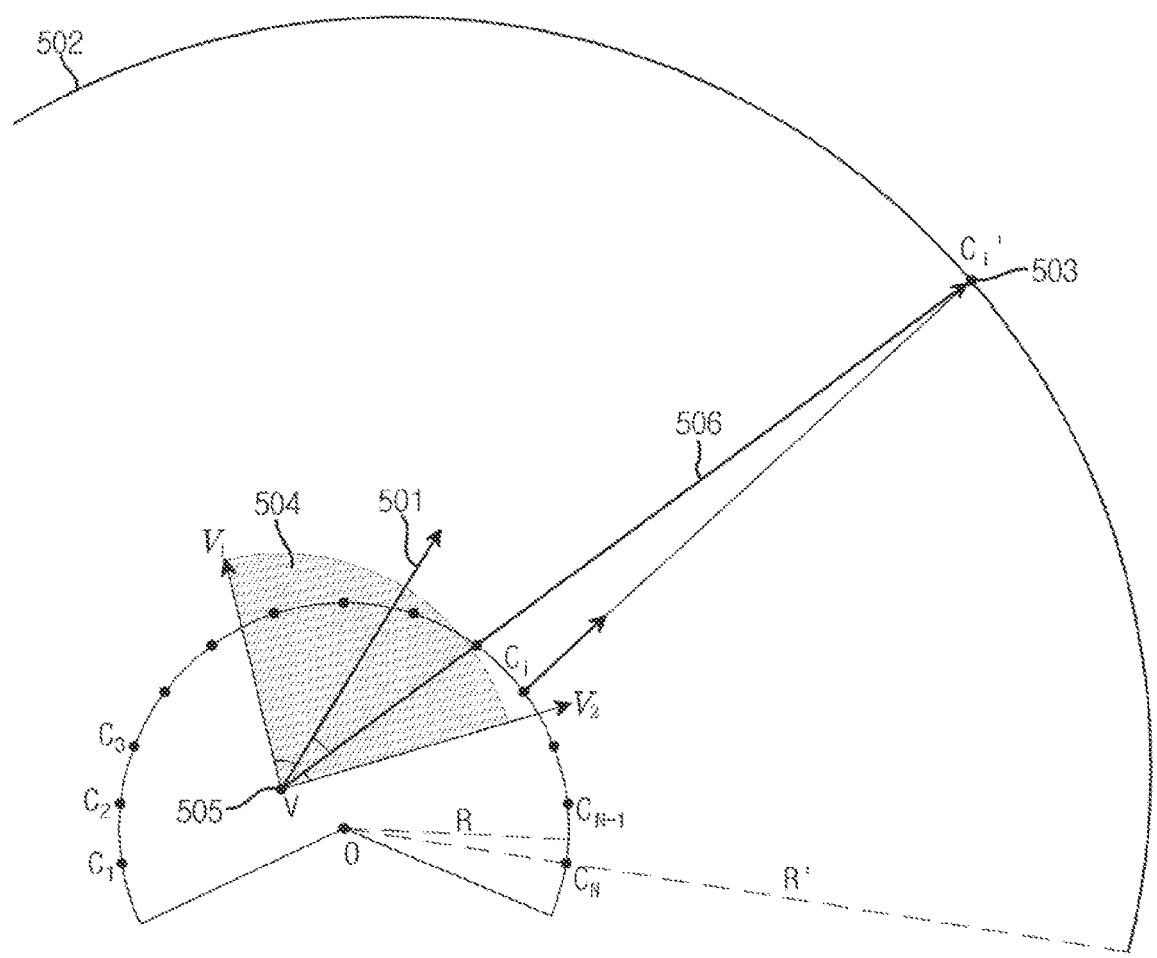
FIG. 5 shows a method of selecting a camera for obtaining an image for synthesizing a virtual view image according to an embodiment of the present disclosure.

FIG. 5 shows a method of selecting a camera for obtaining an input image for synthesizing a virtual view image according to an embodiment of the present disclosure. As one embodiment, it is assumed that the camera rig includes n cameras (n is a natural number, n>=i) and its center is an origin O (0, 0, 0).

As one embodiment, first, the selection method may define a virtual sphere 502 with a significantly extended radius. A position of i-th camera ($C_i$) included in a camera rig may be expressed as $C_i'$ 503 on the virtual sphere 502. This may be performed for every camera included in the camera rig. When every $C_i'$ is determined, a direction from a virtual view position 505 to $C_i'$ 503 may be obtained. Herein, the direction and the position may be represented by a rotation matrix, a direction vector and a position vector but are not limited thereto. A direction of viewing a scene at the virtual view position V 505 may also be represented as a direction vector 501. There is no limit to the method of representing the direction. Whether or not $\sqrt{VC_i'}$ 506 is included in a FoV 504 may be determined by considering the direction vector indicating a viewing direction at the virtual view position and the FoV 504. When it is determined that it is included in the FoV 504, a camera $C_i$ corresponding to the $C_i'$ may be selected. A camera image collected from the selected camera $C_i$ may be used to synthesize an image at the virtual view position.

More particularly, the virtual sphere 503 may be defined as a virtual sphere with a significantly extended radius. The radius of the extended sphere may be determined according to a maximum range of geometry information of a scene or may be set as a radius with any length that is significantly larger than a size of a camera rig. As the radius may be determined by another method, it is not limited to the methods.

Next, by moving each camera included in a camera rig from each camera position by using a direction vector indicating a viewing direction of the camera, a point $C_i'$ meeting the virtual sphere may be obtained. As an example, the calculation for obtaining $C_i'$ may be performed simply by moving a point as shown in Formula (1) below but is not limited thereto.

$$C_i' = C_i + \text{DirectionVector} \cdot (R' - R) \quad \text{Formula (1)}$$

That is, Formula (1) indicates that the camera position $C_i'$ 503 on a virtual sphere is obtained by moving from a camera position $C_i$ by a difference between a radius R of a camera rig and a radius R' of the virtual sphere through a direction vector (DirectionVector in this formula) indicating a viewing direction of a camera. In addition, R may be a radius of a camera rig, and R' may be a radius of the virtual sphere. In addition, for every $C_i'$ 503, vectors 506 from the virtual view position 506 to $C_i'$ may be obtained. Whether or not it is included in the FoV may be determined by obtaining an angle between a direction vector of a virtual view and every $\sqrt{VC_i'}$ 506, as shown in Formula (2) below.

$$\frac{(\text{Direction Vector}_{virtual} \cdot \vec{VC_i'})}{|\text{Direction Vector}_{virtual}| \cdot |\vec{VC_i'}|} < \cos\left(\frac{FoV}{2}\right) \quad \text{Formula (2)}$$

As an example, a camera may be selected by finding out an index i of a camera satisfying the above comparative Formula (2). As this method determines whether or not a direction in which a camera is looking at a scene is included in an FoV, an input image may be selected not based on a center position of each camera but based on a viewing direction.

Figure 6:
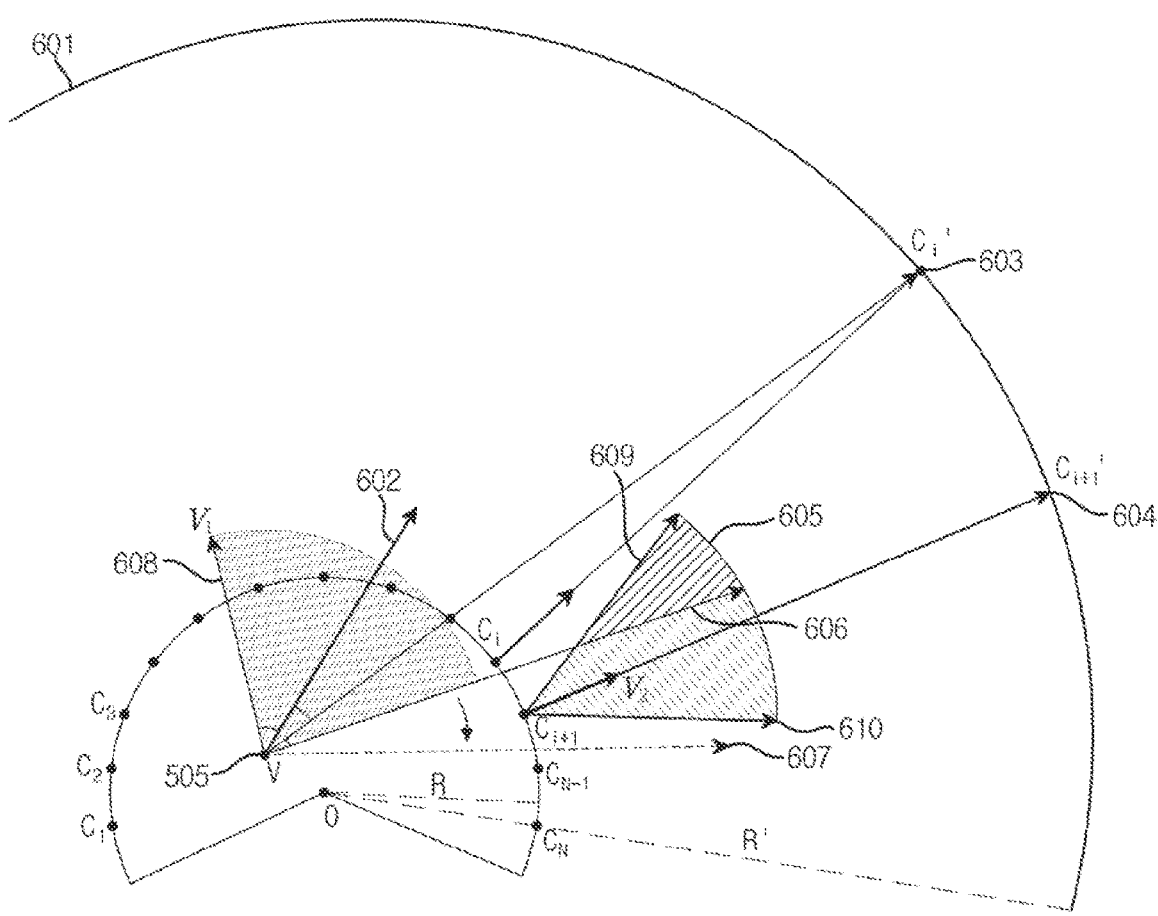
FIG. 6 shows a method of selecting a camera for widening a range including an input image for synthesizing a virtual view image according to an embodiment of the present disclosure.

FIG. 6 shows a method of selecting a camera for widening a range including an input image for synthesizing a virtual view image according to an embodiment of the present disclosure.

More particularly, when a camera is selected to synthesize a virtual view image as described above, there may be a case in which a camera that is determined not to be included in the FoV may be actually used to synthesize a virtual view image. Accordingly, the method concerns a way of additionally selecting the camera.

The process of selecting a camera for synthesizing a virtual view image may include the method described in FIG. 5. It is assumed that a virtual sphere 601, a virtual view position V, a direction vector 602 of viewing from a virtual view position, and a camera rig are all the same as those of FIG. 5. An embodiment of the present disclosure to be described through FIG. 6 below presupposes the implementation method of the present disclosure described through FIG. 5 but is not limited thereto.

Even when the vector 506 of FIG. 5 connecting from a virtual view position to a camera position determined on a virtual sphere is not included in an FoV at the virtual view position, there may be a camera collecting an input image available for virtual view synthesis, that is, a camera of which the FoV overlaps with the FoV at the virtual view position.

To make up for such a case, it is possible to apply a method of extending a range including a camera providing an input image by considering a virtual FoV that is extended from an actual FoV.

For example, according to the method of FIG. 5, $C_i$ may be included but not $C_{i+1}$ in order to synthesize a virtual view image. It is because a vector from a virtual view position V of a virtual sphere, to which $C_i$ moves, to $C_i'$ 603 is included in the FoV but not a vector from V to $C_{i+1}'$ 604. $C_{i+1}'$ representing a position on a virtual sphere of the i+1th camera does not satisfy the condition of Formula (2). However, there is an overlap 605 between an FoV at virtual view position V and an FoV of $C_{i+1}$, and $C_{i+1}$ may also be used to synthesize a virtual view image. Accordingly, it is desirable to select $C_{i+1}$.

For example, when, determining whether or not there is an overlap 605 between FoVs, a method of comparing cosine values between an FoV of a virtual view and an FoV of $C_{i+1}$ may be used. Whether or not an image of $C_{i+1}$ maybe used to synthesize a virtual view may be determined by comparing two lines 606 and 608 constituting an FoV of a virtual view image and two lines 609 and 610 constituting an FoV at a camera position. More particularly, for example, when $C_{i+1}$ is to the right of the line 606 constituting an FoV at a virtual view position, it may be determined whether or not there is a contact point between the line 606 and the line 609. When $C_{i+1}$ is to the left of a line, which is on the left side of a virtual view direction vector 602, out of the lines constituting a virtual view FoV, it may be determined whether or not there is a contact point between the left-side line and the right line of $C_{i+1}$ FoV. Thus, it may be determined whether or not the camera may be included. The lines 606, 607, 608, 609 and 610 constituting the FoVs may be vectors, and determining an overlap between FoVs is not limited to the above method.

As one embodiment, extending an FoV at a virtual view used for the comparison of Formula 2 may be considered to include an image of $C_{i+1}$. For example, the line 606 may move to the line 607 according to the extension of FoV. Herein, the extension may be as large as an FoV of an input image provided by $C_{i+1}$, as shown in Formula (3) below or be as large as a preset FoV with an arbitrary size but is not limited thereto. $FoV_{input}$ represents an FoV value that is newly extended, and $FoV_{extended}$, that is, an extended FoV may be obtained by adding $FoV_{input}$ and $FoV_{virtual}$.

$$FoV_{Extended} = FoV_{Virtual} + FoV_{Input} \quad \text{Formula (3)}$$

Moreover, a method of remembering only the index of the camera without extending an FoV itself maybe used, but the present disclosure is not limited thereto.

Figure 7:
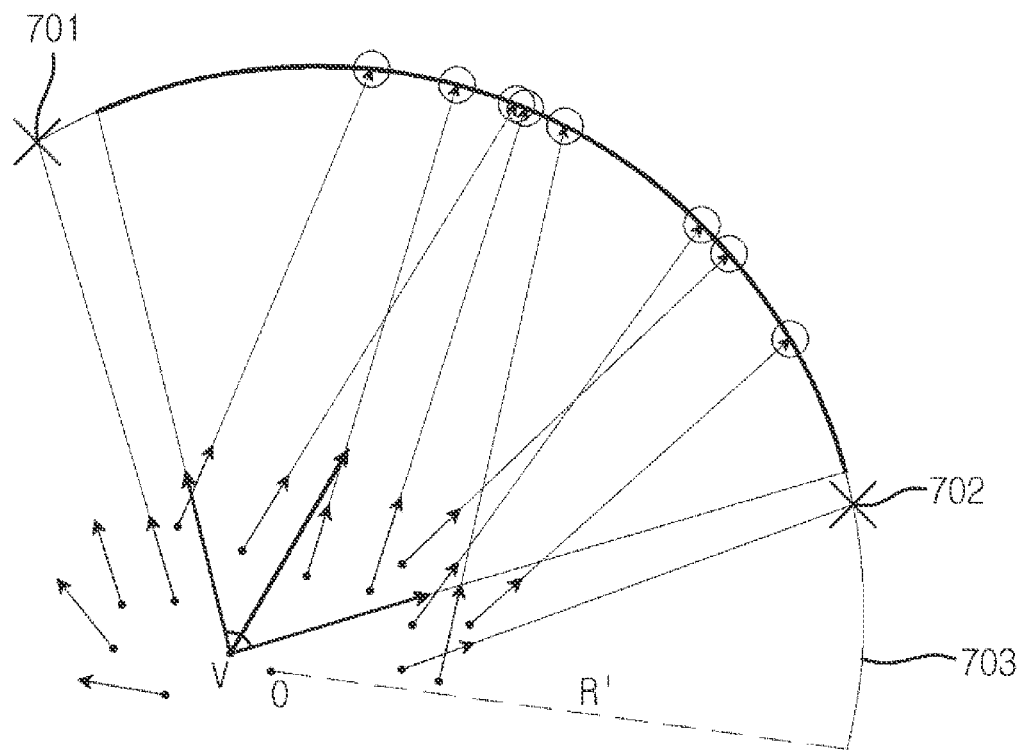
FIG. 7 shows a method of selecting a suitable camera included in an unstructured omnidirectional camera rig according to an embodiment of the present disclosure.

FIG. 7 shows a method of selecting a suitable camera included in an unstructured omnidirectional camera rig in order to select an input image for synthesizing a virtual view according to an embodiment of the present disclosure.

In a method of selecting a camera providing an input image for virtual view image synthesis according to an embodiment of the present disclosure, an available camera rig is not limited to the spherical shape as described above. Accordingly, even when the camera rig is unstructured for all the directions, it may be equally applied. This will be described in further detail using FIG. 7.

In this case again, any virtual sphere 703 with an extended radius may be used in the same way as described in FIG. 5, and the method of FIG. 5 may be mostly applied. However, it is possible to add a process of finding a position on the virtual sphere by using a camera position vector and a direction vector of an input camera, not the simple movement based on the difference between radii in Formula (1) as described in FIG. 5. In this case again, determining a camera included in an FoV by obtaining a direction vector and an angle difference in a virtual view image may use the same method of FIGS. 5 to 6 but is not limited to thereto. It is determined that a camera corresponding to camera positions 701 and 702 on a virtual sphere is not used to synthesize a current virtual view. However, depending on a size of camera FoV, the camera may be included to be used for virtual view synthesis according to the method of FIG. 6.

Figure 8:
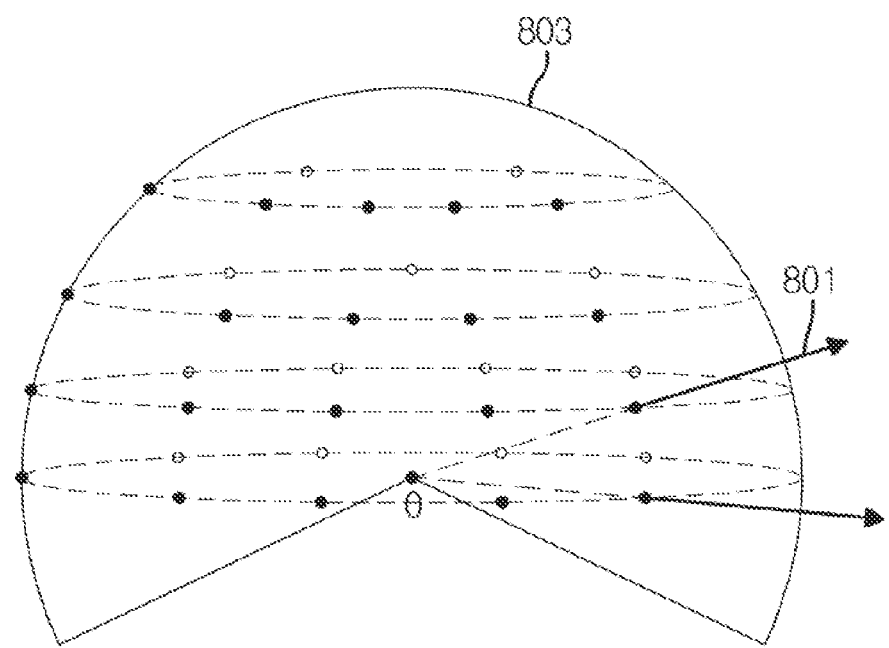
FIGS. 8, 9, 10A, 10B and 10C are views for describing a method of selecting a camera included in an equally radial camera rig according to another embodiment of the present disclosure.
Figure 8:
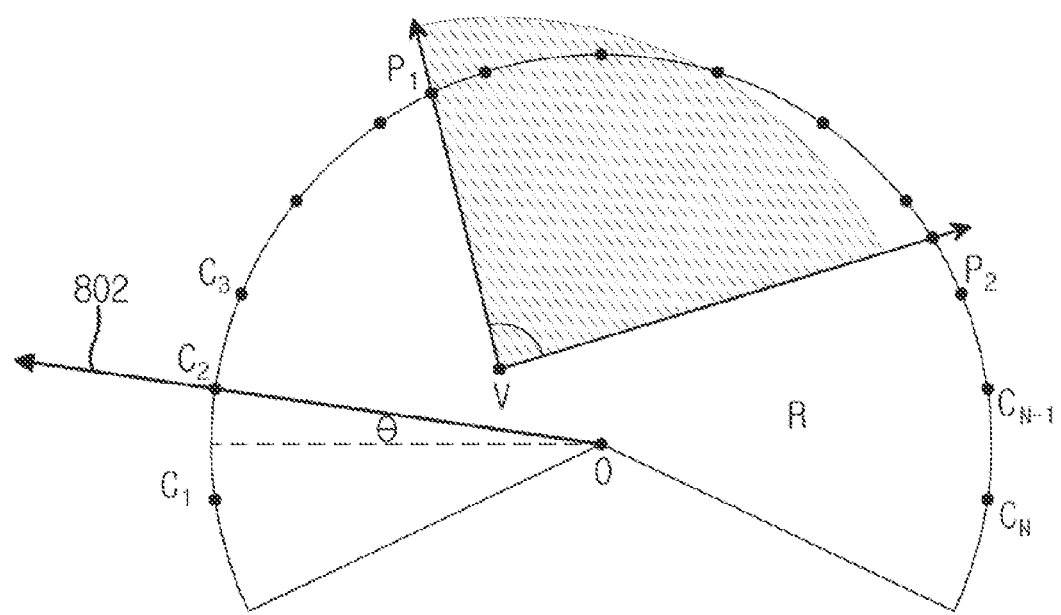
Figure 9:
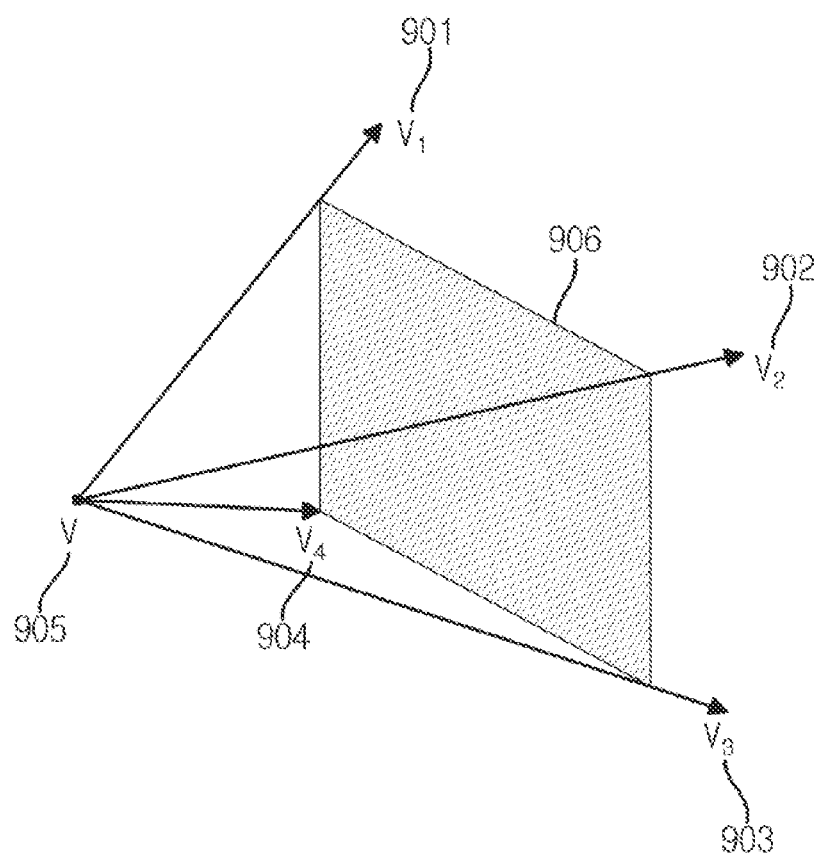
Figure 10A:
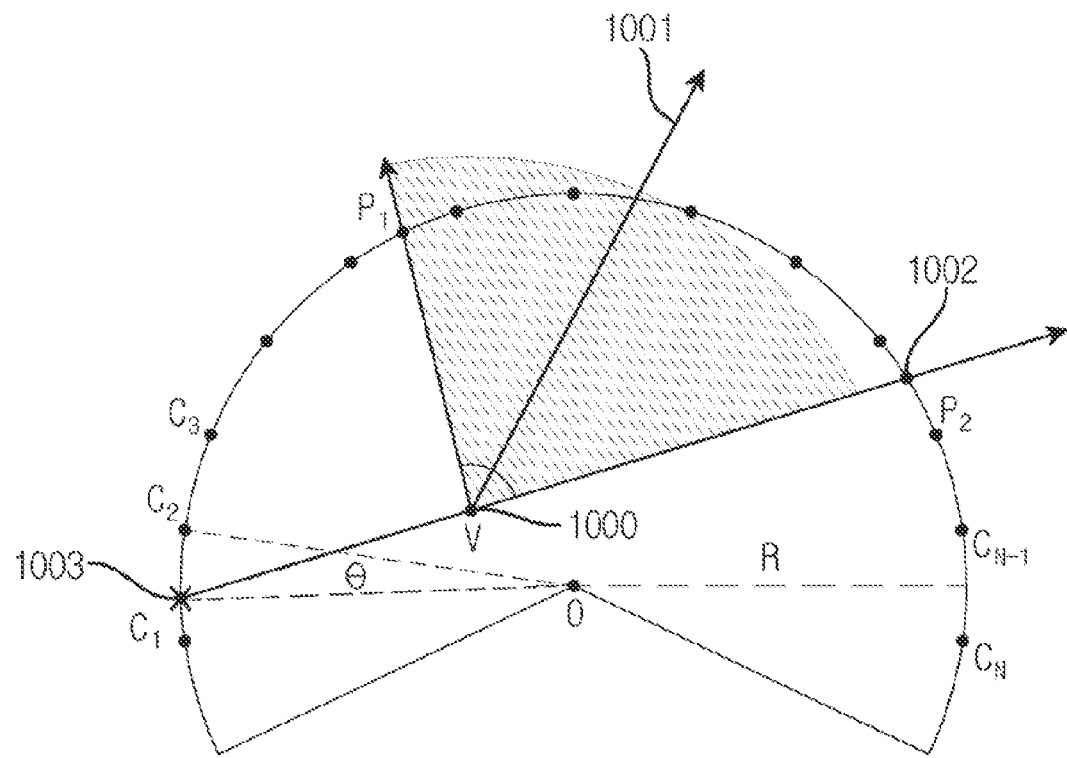
Figure 10B:
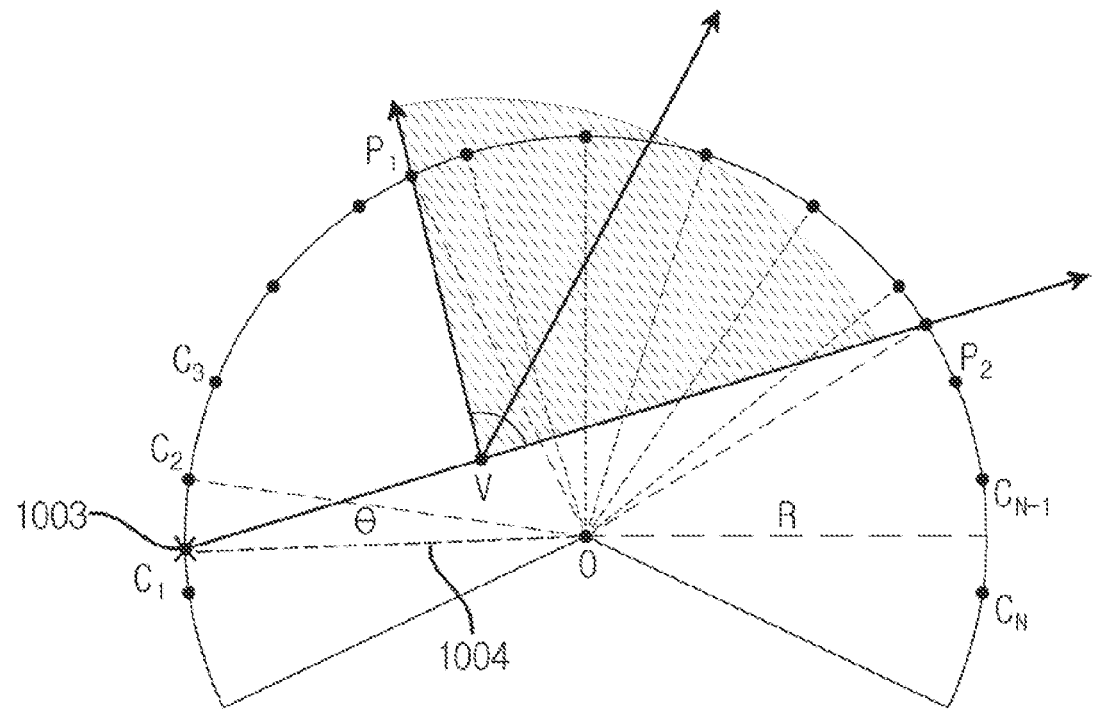
Figure 10C:
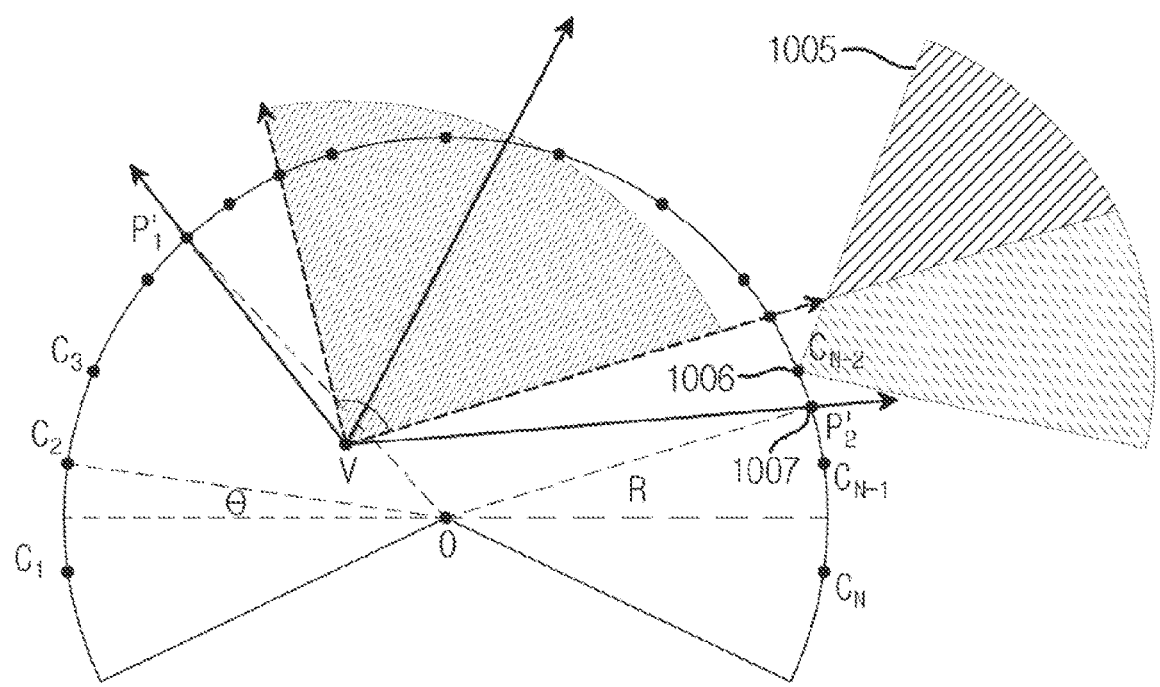

FIGS. 8, 9 and 10 are views for describing a method of selecting a camera by using an equally radial camera rig according to another embodiment of the present disclosure. More particularly, FIG. 8 illustrates, as an embodiment, a camera rig that is equally radial for all directions, and FIG. 9 illustrates, as an embodiment, a projection center of a virtual view image, that is, a vector passing a virtual view position and four vertexes of FoV. In addition, FIG. 10A, FIG. 10B and FIG. 10C illustrate, as an embodiment, a method of selecting a camera when a camera rig is equally radial.

The above-described method of selecting a camera providing an input image may be applied whatever structure of a camera rig is used. Accordingly, it is obvious that the method expressed by FIG. 5 and FIG. 6 may also be applied to a case in which a camera rig is spherical and equally radial for all directions. However, in this case, a simpler method of selecting a camera may be applied. This will be described below.

As one embodiment, for a camera rig that is equally radial for all directions, when the center of the camera rig is an origin as shown in FIG. 8, cameras are located on the surface of a sphere 803 with radius R, and a direction 801 viewed by each camera meets a direction from the origin to outside, that is, a vector 802 passing the origin and the camera center, a camera may be selected without obtaining vectors $\sqrt{VC_i}$ calculated for determination in the method.

First, there may be various projection formats of a virtual view image like the perspective projection and the equirectangular projection (ERP). However, as projection formats may be converted to each other, the perspective projection is assumed to describe embodiments of the present disclosure.

As one embodiment, an FoV at a virtual view position may be expressed as a closed figure of rectangle, that is, a focal plane 906, for convenience sake. Herein, four vectors $V_1$ 901, $V_2$ 902, $V_3$ 903 and $V_4$ 904 passing a virtual view position 905 (projection center of a virtual view image) and the four vertexes of the focal plane 906 may be defined. $P_1$, $P_2$, $P_3$ and $P_4$, which are points where the vectors meet a spherical surface on which the camera centers of camera rig are located, may be obtained as follows.

First, a spherical camera rig may be expressed as follows.

$$(x-c_x)^2+(y-c_y)^2+(z-c_z)^2=R^2 \quad \text{Formula (4)}$$

The formula assumes that the center of a camera rig is ($C_x$, $C_y$, $C_z$). For the convenience of calculation, a coordinate system may be moved so that the center of camera rig becomes the origin (0, 0, 0). It was assumed above that the center of a camera rig is the origin. Also, in order to obtain $P_1$, $P_2$, $P_3$ and $P_4$, the equation of straight line may be expressed as follows.

$$\frac{x-x_1}{a} = \frac{y-y_1}{b} = \frac{z-z_1}{c} = d \quad \text{Formula (5)}$$

As the straight line represented by Formula (5) is intended to obtain respective points $P_1$, $P_2$, $P_3$ and $P_4$ at which $V_1$ 901, $V_2$ 902, $V_3$ 903 and $V_4$ 904 meet a spherical surface, the respective points may have slopes a, b and c and intercepts ($x_1$, $y_1$, $z_1$) respectively. As illustrated in FIG. 10, the slopes a, b and c and the intercepts ($x_1$, $y_1$, $z_1$) may be obtained by connecting two points (the projection center of a virtual view image and four vertexes constituting a focal plane), and a point position on the straight line may be determined according to the parameter d. As $P_1$, $P_2$, $P_3$ and $P_4$ are on a spherical surface of a rig of the camera and exists on the straight line at the same time, when putting the equation of straight line into the equation of a sphere, the result may be the following formula.

$$(ad+x_1)^2+(bd+y_1)^2+(cd+z_1)^2=R^2 \quad \text{Formula (6)}$$

Formula (6) may be rearranged as follows.

$$(a^2+b^2+c^2)d^2+(2a(x_1-c_x)+2b(y_1-c_y)+2z(z_1-c_z))d+(x_1-c_x)^2+(y_1-c_y)^2+(z_1-c_z)^2-r^2=0 \quad \text{Formula (7)}$$

Formula (7) maybe rearranged into a quadratic equation with respect to d, for which the following quadratic formula may be used.

$$d = \frac{-B \pm \sqrt{B^2-4AC}}{2A} \quad \text{Formula (8)}$$

where $$Ad^2 + Bd + C = 0 (A \neq 0, B^2 - 4AC > 0)$$

Using Formula (8), d may be found. Once d is determined, the x, y and z coordinates of $P_1$, $P_2$, $P_3$ and $P_4$ may be obtained.

Meanwhile, since there may be two intersection points 1002 and 1003 between the equation of straight line and a sphere when a virtual viewpoint 1000 is within the sphere as in FIG. 10A, 10B and 10C, it should be noted that an intersection point is to be found in an FoV direction. In this regard, an intersection point should be found in a direction coincident with a direction vector 1001 of a virtual view. For example, it is possible to use a method in which an internal angle may be obtained from an inner product of the four vectors $V_1$ 901, $V_2$ 902, $V_3$ 903 and $V_4$ 904 and the direction vector 1001 of the virtual view and then an intersection point in an FoV direction is found by using the internal angle. However, the present disclosure is not limited to this method.

As one embodiment, when finding all the four intersection points $P_1$, $P_2$, $P_3$ and $P_4$ by the above method, cameras inside a closed figure constructed by the intersection points may be selected.

Herein, whether or not a camera is located inside the closed figure may be determined according to FIG. 10B. For example, an angle between a radius of a camera rig and a center of a camera may be used to indicate a position of the camera. Since it is assumed that a camera rig is equally radial for all directions, a position of each camera from a given camera parameter may be defined as polar coordinates that are indicated using an angle (θ) 1004 between a radius value of the camera rig and the camera.

Herein, as one embodiment, since the four intersection points $P_1$, $P_2$, $P_3$ and $P_4$ may also be obtained as polar coordinates from a center (here, origin) of a camera rig, when a coordinate of each camera included in the camera rig is in an intersection made by the polar coordinates of the intersection points, the corresponding camera may be selected. As each camera's viewing direction coincides with each coordinate of the camera, this method may simply select a camera providing an input image without obtaining a vector from every virtual view position to a carrier a position.

In addition, as shown in FIG. 10C, a range including an input image maybe increased by partially extending an FoV of a virtual view. For example, this may be performed by the method described with reference to FIG. 6. That is, even when a specific camera 1006, for example, has no center in an area made by four intersection points, if there is an overlap 1005 between an FoV of the camera 1006 and the closed figure, the camera 1006 may be additionally included as a camera necessary for virtual view image synthesis, and an FoV of a virtual view may be partially extended (1007).

An input image collected from a camera that is selected through the above method may be expressed as a selected image as it is and may be used to synthesize a virtual view image.

Figure 11:
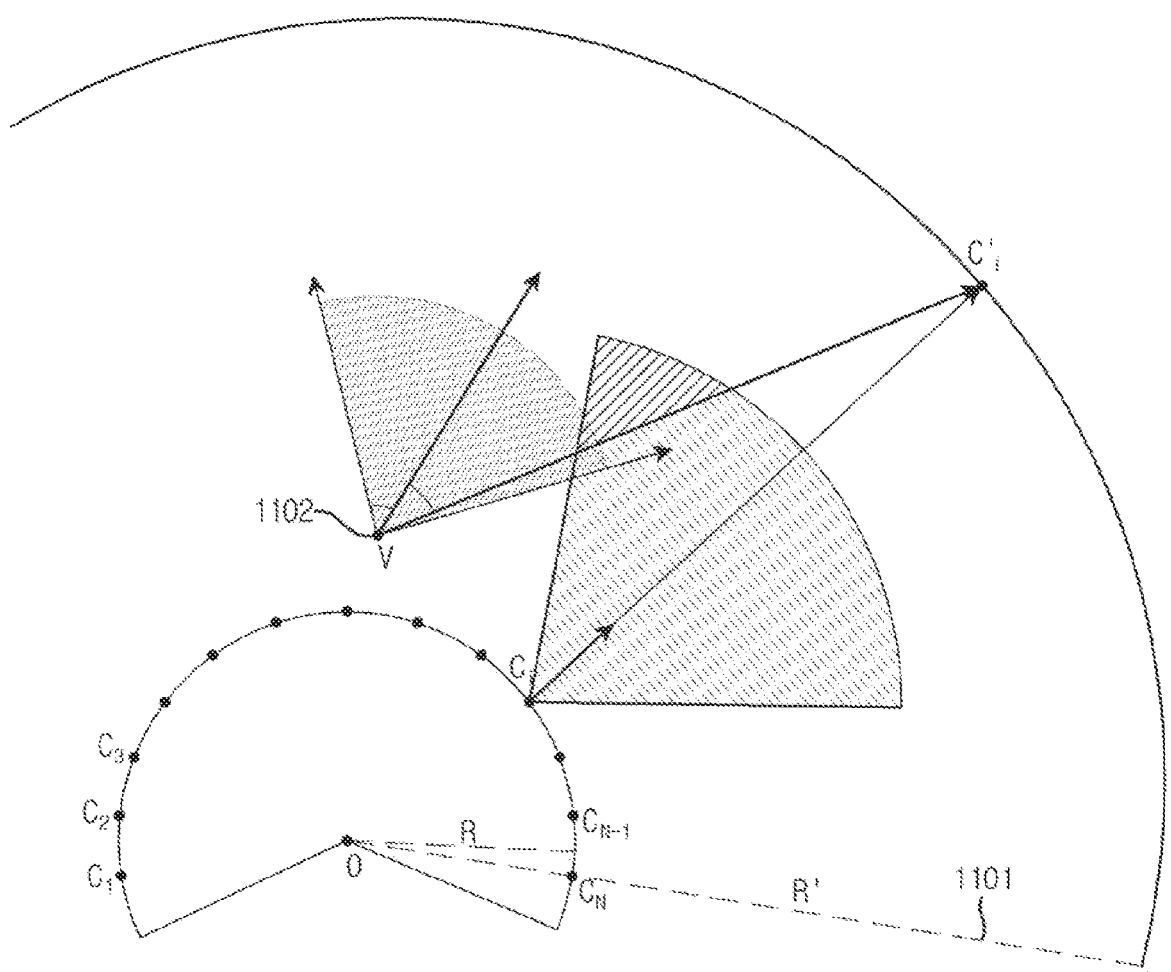
FIG. 11 shows a method of selecting a camera providing an input image when a virtual view is located outside a camera rig, according to another embodiment of the present disclosure.

FIG. 11 shows a method of selecting a camera providing an input image when a virtual view is located outside a camera rig, according to another embodiment of the present disclosure. As there is no limit, to the position of a virtual view, the virtual view may be located not only inside but also outside a camera rig. However, when a virtual view position 1102 is far away from a camera rig, a relative size of an FoV projected to a virtual sphere, which is extended for the virtual view and an input image, may change. Accordingly, in such a case, it is possible to consider setting a radius R' 1101 that is much larger than a size of a camera rig.

Figure 12:
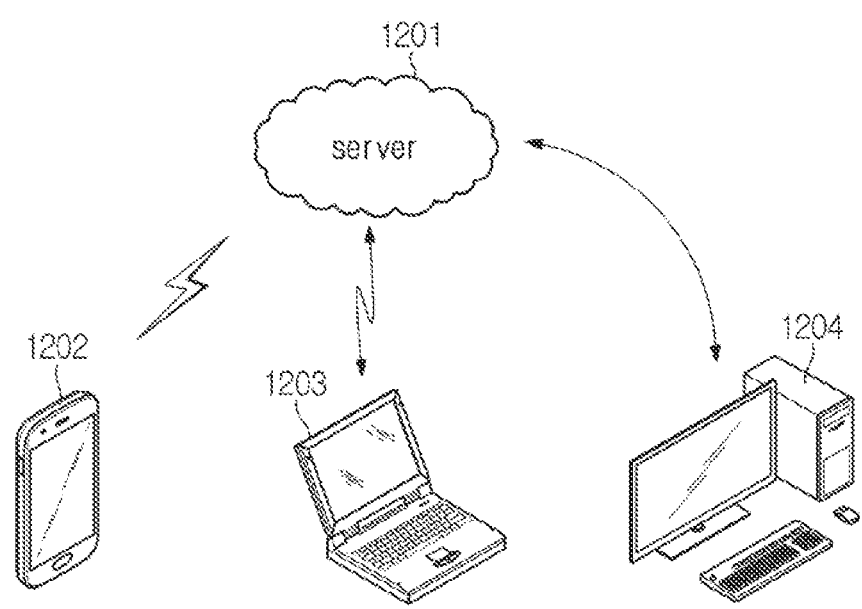
FIG. 12 illustrates an environment in which an apparatus and method for selecting a camera providing an input image for synthesizing a virtual view image may be implemented according to an embodiment of the present disclosure.

FIG. 12 illustrates an environment in which an apparatus and method for selecting a camera providing an input image for synthesizing a virtual view image may be implemented according to an embodiment of the present disclosure. The selection apparatus and method may be the same as described above, and a server 1201 and terminals 1202, 1203 and 1204 maybe connected directly through wired/wireless internet or through a peer-to-peer (P2P) network on the Internet. The constituents of the selection apparatus and the steps of the selection method may be implemented based on a division between a server and a terminal. That is, every constituent or every step may be implemented in a server or a terminal, and some constituents or steps may be performed in a server and the remaining constituents or steps may be performed in a terminal. In other words, there is no limit to the implementation method only a server and a terminal may communicate with each other.

In addition, a server may be any type including a centralized type and a cloud server, and a terminal may also be any electronic device like a smartphone, a desktop, a laptop, a pad, etc. as long as they are capable of communication.

As an example, a camera for virtual view image synthesis may be included in separate terminals 1202, 1203 and 1204, and an input image may be collected from a camera included in the terminals.

For example, when it is assumed that a server selects a suitable camera, the process of FIG. 5 and FIG. 6 may be implemented in the server. In this regard, the server may receive an input image from each terminal 1202, 1203 and 1204. However, cameras of each terminal should be expressed by relative positions to each other. That is, each camera of each terminal should be expressed in one x, y and z coordinate system and thus should be handled as a single camera rig. In addition, on the contrary, a terminal may select a suitable camera, but it should be noted that the present disclosure is not limited to the embodiment.

The various forms of the present disclosure are not an exhaustive list of all possible combinations and are intended to describe representative aspects of the present disclosure, and the matters described in the various forms may be applied independently or in combination of two or more.

For example, according to an embodiment of the present disclosure, a computer program, by being stored in a medium, for selecting a camera providing an input image to synthesize a virtual view image, the computer program may comprise, for a camera providing an input image, determining whether or not the camera is comprised in a field of view (FoV) at a virtual view position and in response to the camera determined to be comprised, selecting the camera to synthesize the virtual view image, wherein whether or not the camera is comprised is determined by comparing a direction from the virtual view position to a position of the camera and the FoV at the virtual view position.

In addition, a computer that implements the computer program stored in the medium for selecting a camera providing an input image to synthesize a virtual view image may include a mobile information terminal, a smart phone, a mobile electronic device, and a stationary type computer, to which the present disclosure is not limited.

In addition, various forms of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. It will be apparent to those skilled in the art that various substitutions, modifications, and changes are possible are possible without departing from the technical features of the present disclosure. It is therefore to be understood that the scope of the present disclosure is not limited to the above-described embodiments and the accompanying drawings.

What is claimed is:

1. A method of selecting a camera providing an input image to synthesize a virtual view image, the method comprising:
   for a camera providing an input image, determining whether or not the camera is comprised in a field of view (FoV) at a virtual view position; and
   in response to the camera determined to be comprised in the field of view, selecting the camera to synthesize the virtual image,
   wherein determining, whether or not the camera is comprised in the FoV at the virtual view point is based on whether or not a direction from the virtual view position to a position of the camera is in the FoV at the virtual view position,
   wherein the position of the camera is represented on a virtual sphere with an extended radius, and
   wherein the position of the camera on the virtual sphere is determined as a point at which the camera meets the virtual sphere when the camera is moved from an actual camera position in a viewing direction of the camera.

2. The method of claim 1, further comprising determining, in response to the camera determined not to be comprised, whether or not there is an overlap between an FoV of the camera and the FoV at the virtual view position.

3. The method of claim 2, further comprising extending, in response to the determining that there is the overlap, the FoV at the virtual view position to comprise the camera.

4. The method of claim 3,
   wherein the extending of the FoV at the virtual view position comprises extending the FoV at the virtual view position to the FoV of the camera or extending the FoV at the virtual view position to an FoV with a predetermined size.

5. The method of claim 1,
   wherein, in response to a camera rig being spherical, the position of the camera on the virtual sphere is determined by moving by a difference of radius between the virtual sphere and the camera rig in the viewing direction of the camera.

6. The method of claim 1,
   wherein the virtual view position is outside the camera rig.

7. The method of claim 1,
   wherein, in response to a camera rig being equally radial in all directions, a viewing direction of the camera coincides with a direction from a center of the camera rig to a center of the camera.

8. The method of claim 7,
   wherein the determining comprises:
   defining the FoV as an area with four vertexes;
   defining a straight line connecting the four vertexes from the virtual view position;
   obtaining intersection points between the four vertexes and a spherical surface of the camera rig; and
   selecting a camera located in a figure constructed by the intersection points.

9. An apparatus for selecting a camera providing an input image to synthesize a virtual view image, the apparatus comprising:
   a receiver for receiving information on a camera providing an input image; and
   a processor for using the information on the camera providing the input image, determining, for the camera, whether or not the camera is comprised in an field of view FoV at a virtual view position, and in response to the camera determined to be comprised, selecting the camera to synthesize the virtual image,
   wherein the processor determines whether or not the camera is comprised in the FoV at the virtual view point based on whether or not a direction from the virtual view position to a position of the camera is in the FoV at the virtual view position,
   wherein the position of the camera is represented on a virtual sphere with an extended radius, and
   wherein the position of the camera on the virtual sphere is determined as a point at which the camera meets the virtual sphere when the camera is moved from an actual camera position in a viewing direction of the camera.

10. The apparatus of claim 9,
    wherein the processor, in response to the camera determined not to be comprised, determines whether or not there is an overlap between an FoV of the camera and the FoV at the virtual view position.

11. The apparatus of claim 10,
    wherein the processor, in response to the determining that there is the overlap, extends the FoV at the virtual view position to comprise the camera.

12. The apparatus of claim 11,
    wherein, in response to the extending the FoV, the FoV at the virtual view position is extended to the FoV of the camera or is extended to an FoV with a predetermined size.

13. The apparatus of claim 9,
    wherein the virtual view position is outside the camera rig.

14. The apparatus of claim 9,
    wherein information on the camera providing the input image comprises the content that a camera rig is equally radial in all directions and a viewing direction of the camera coincides with a direction from a center of the camera rig to a center of the camera.

15. The apparatus of claim 14,
    wherein the processor, in response to the determining whether or not the camera is comprised, defines the FoV as an area with four vertexes, obtains intersection points between the four vertexes and a spherical surface of the camera rig and then selects a camera located in a figure constructed by the intersections.

16. A non-transitory computer readable medium storing computer program when executed causes a computing device to perform a method comprising:
- for a camera providing an input image, determining whether or not the camera is comprised in a field of view (FoV) at a virtual view position; and
- in response to the camera determined to be comprised, selecting the camera to synthesize the virtual view image,
- wherein determining whether or not the camera is comprised in the FoV at the virtual view point is based on whether or not a direction from the virtual view position to a position of the camera is in the FoV at the virtual view position,
- wherein the position of the camera is represented on a virtual sphere with an extended radius, and
- wherein the position of the camera on the virtual sphere is determined as a point at which the camera meets the virtual sphere when the camera is moved from an actual camera position in a viewing direction of the camera.

* * * * *